March 2, 1943. V. W. CUNNINGHAM 2,312,319
APPARATUS FOR WASHING GLASSES AND THE LIKE
Filed March 21, 1941 3 Sheets-Sheet 1

Patented Mar. 2, 1943

2,312,319

UNITED STATES PATENT OFFICE 2,312,319

APPARATUS FOR WASHING GLASSES AND THE LIKE

Vincent W. Cunningham, deceased, late of Chicago, Ill., by Thomas H. Corbett, administrator, Chicago, Ill.

Application March 21, 1941, Serial No. 384,512

20 Claims. (Cl. 15—76)

This invention relates generally to the washing of utensils such as glasses and more particularly it relates to apparatus for washing and rinsing utensils such as glasses and the like.

In the washing of glasses in commercial establishments such as restaurants, bars, soda fountains and the like, it has been found that by rapidly scrubbing the inside and outside surfaces of glasses in the presence of a vigorous flow of a free-rinsing washing solution along such surfaces of the glass, it is possible to thoroughly cleanse each glass in a relatively short washing or scrubbing operation; and it has also been found that when the glasses have been so scrubbed in a free-rinsing washing solution, and are thoroughly rinsed with a clear water rinse, the glasses will dry without towelling to produce a sparkling and unspotted appearance.

This method of washing glasses has been widely practiced, but its application has been limited to a considerable extent by the cost and the relatively large space requirements of the apparatus involved in the scrubbing and rinsings of the glasses. For example, the scrubbing operation has heretofore been performed by means of a brush assembly rotatably mounted on a vertically extending axis in a tank adapted to contain the washing solution, the brush assembly having inside and outside brushes arranged to scrub the corresponding surfaces of an inverted glass held substantially stationary in association with the brush assembly, and the desired flushing flow of washing solution endwise of the brush assembly and along the glasses has been produced by means operating as an incident to the rotation of the brush assembly. After scrubbing, the glasses have heretofore been rinsed in a rinse chamber located at the same level as the wash tank and at the rear or at one side of the wash tank.

Thus the prior equipment for accomplishment of the hereinbefore described method of glass washing has required considerable area in a horizontal plane; and in addition, the required bearings and drive mechanism for the brush assembly have been located beneath the wash tank so that the vertical dimensions involved in such equipment have limited or dictated the location and mounting of such equipment.

In view of the foregoing, the primary object of the present invention is to enable the required apparatus for performing the aforesaid method of washing glasses to be employed in locations or establishments which have heretofore been considered to be too small for the installation of the requisite apparatus.

A further object is to enable apparatus for scrubbing and rinsing glasses to be manufactured in a uniform size and design which is adapted for a quick and convenient mounting or installation in a wide variety of different environments and conditions; and further objects related to the foregoing are to enable the fundamental elements of such apparatus to be so arranged as to attain unusual compactness; to enable the elements of such compactly arranged apparatus to be readily inspected and serviced; and to effectually guard the driving motor and the electrical connections of such a compact apparatus from the washing solution and rinse water.

Another object of the invention is to circulate washing solution through a horizontally mounted scrubbing unit in such a manner as to prevent splashing; to so mount the horizontally positioned scrubbing unit as to facilitate its removal and replacement; and to associate a rinse compartment with such a scrubbing unit in such a manner as to conserve space while allowing ready removal of the rinse compartment for purposes of inspection or repair.

A further object is to associate a rinse compartment with a scrubbing unit so that drainage of the rinse compartment is attained in a simple and effective manner; and to so mount and relate the rinse compartment to the other elements of the apparatus that the rinse compartment is removably held in place solely by a portion of the rinse water supply line.

Other and further objects will become apparent from the following description and claims taken in connection with the accompanying drawings in which:

Fig. 2 is a perspective view of the machine in another type of mounting or installation in which it is supported upon the drain board of a conventional soda fountain.

Fig. 3 is a perspective view of the machine in still another type of installation wherein the machine is set in a suitable opening in the drain board of a bar or the like.

For purposes of disclosure a single form of the invention is illustrated in the drawings, and this particular form of the invention will hereinafter be described in detail, but it is to be understood that this disclosure is not intended as a limitation of the invention to the particular form and arrangement herein shown, it being contemplated that various changes might be made by those skilled in the art without departing from the spirit and scope of the invention as defined by the appended claims.

Figures 2, 3:
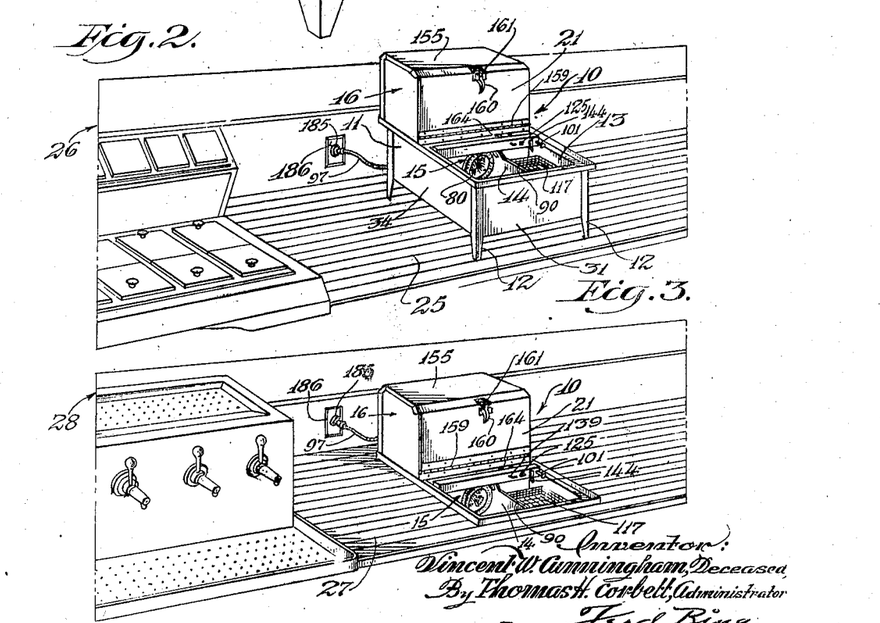
Figures 4, 5:
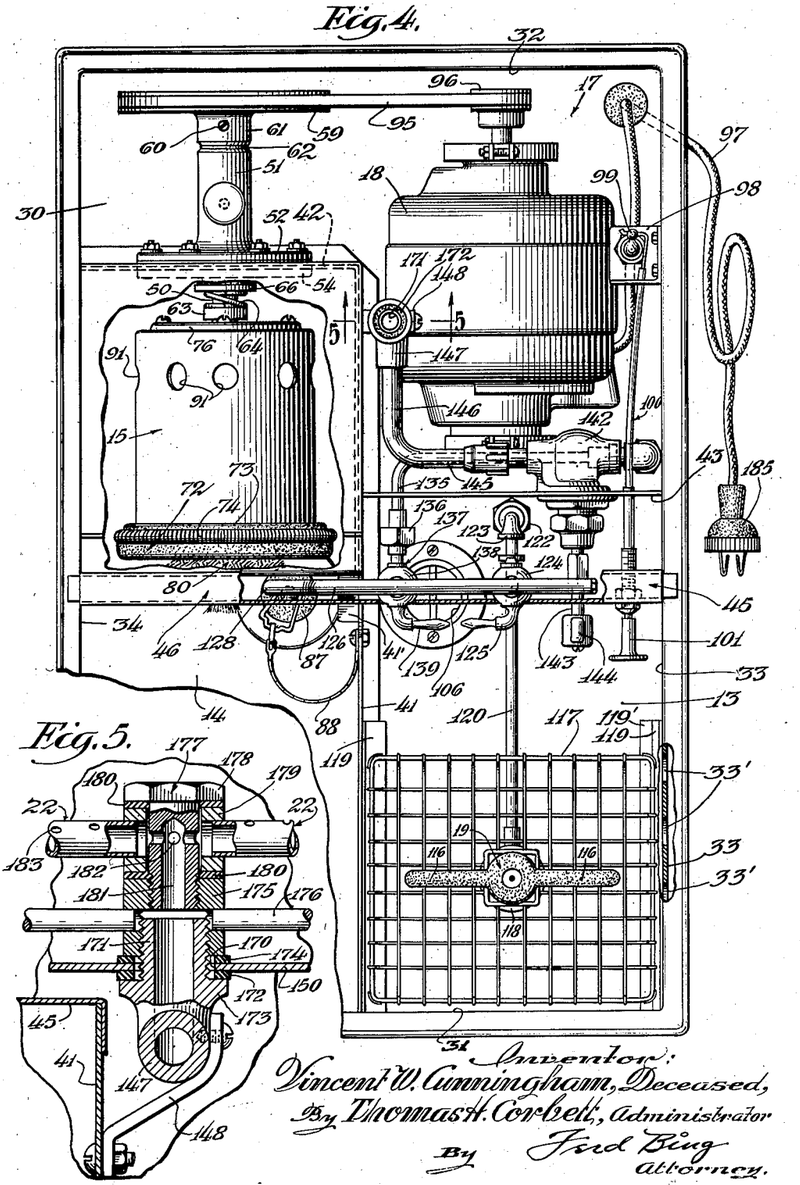
Fig. 4 is a fragmental plan view showing the machine with the upstanding rinse compartment removed, and with a portion of the casing broken away to show the construction and mounting of the glass scrubbing drum.
Fig. 5 is a fragmental vertical sectional view taken along the line 5—5 of Fig. 4.

For purposes of disclosure the invention is herein illustrated as embodied in a compact and efficient glass scrubbing and rinsing unit 10 having a rectangular, open-top tank-like base 11 adapted to be supported, as shown in Fig. 2, upon relatively short legs 12 formed at the corners thereof. The base 10 is formed to provide an upwardly opening flushing compartment 13, a glass washing or scrubbing compartment 14 adapted to contain washing solution and in which compartment a glass scrubbing unit 15 is mounted. Across the rear portion of the base 11 a rinsing compartment 16 is positioned so as to conceal a drive compartment 17 which is shown in Fig. 4 of the drawings and which houses a drive mechanism including a motor 18 for rotating the scrubbing unit 15. Within the flushing compartment 13, a flush nozzle 19 is provided so that cream fat and other substances which tend to reduce the strength of a washing solution may be flushed from the glasses prior to the washing operation.

In the use of the machine, the glasses are in many instances rinsed or flushed at the flush nozzle 19, after which each glass is lowered into the washing compartment 14 and moved rearwardly into cooperative engagement with the scrubbing unit 15 so that the glass is scrubbed on the inner and outer side wall surfaces thereof and on the inside bottom surface. The glass is then withdrawn and is placed in an inverted position in a suitable holder or rack such as a wire basket 20 which is of such a size that it may be introduced into the rinse compartment 16 through the forward door 21 thereof. The basket 20 is, of course, filled with scrubbed glasses before it is placed in the rinse compartment 16, and while in the rinse compartment the basket 20 is supported in upwardly spaced relation to the bottom of the rinse compartment so that a spray means such as a rotating spray arm 22 may discharge rinse water upwardly onto the glasses.

Figure 1:
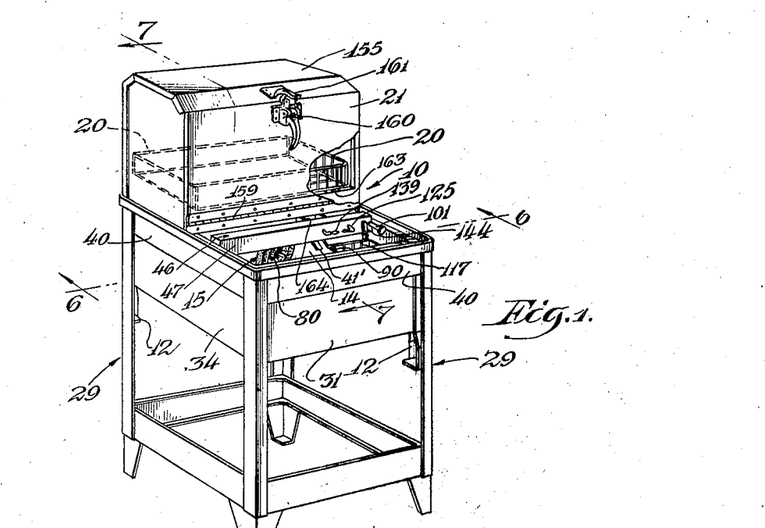
Fig. 1 is a perspective view illustrating a glass washing machine embodying the features of the invention, the machine being mounted in a floor stand which supports the machine at a proper working height.

The glass scrubbing and rinsing 10 is compact in form, and is adapted to be utilized in a variety of different mountings or environments as will be evident from a consideration and comparison of Figs. 1 to 3 of the drawings. Thus, in Fig. 2 of the drawings the machine 10 is supported on its legs 12 on the top of a drain board 25 of a conventional soda fountain 26; in Fig. 3 of the drawings the machine 10 is illustrated in a depressed mounting in a drain board 27 of a bar 28; while in Fig. 1 of the drawings the machine 10 is supported on a separately formed stand 29 into the upper end of which the machine 10 has been lowered. Such a variety in the mode of mounting the machine 10 is attained in a relatively simple manner which requires no change or alteration in the form or mechanism of the machine, so that the machine constitutes a basic unit adapted to be merchandised throughout a wide field.

Figure 6:
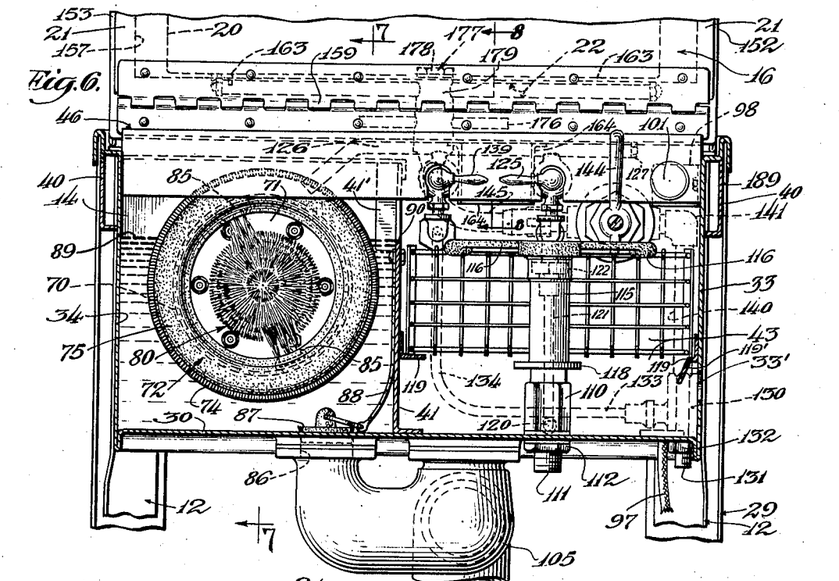
Fig. 6 is a fragmental vertical sectional view taken along the line 6—6 of Fig. 1.
Figures 7, 8:
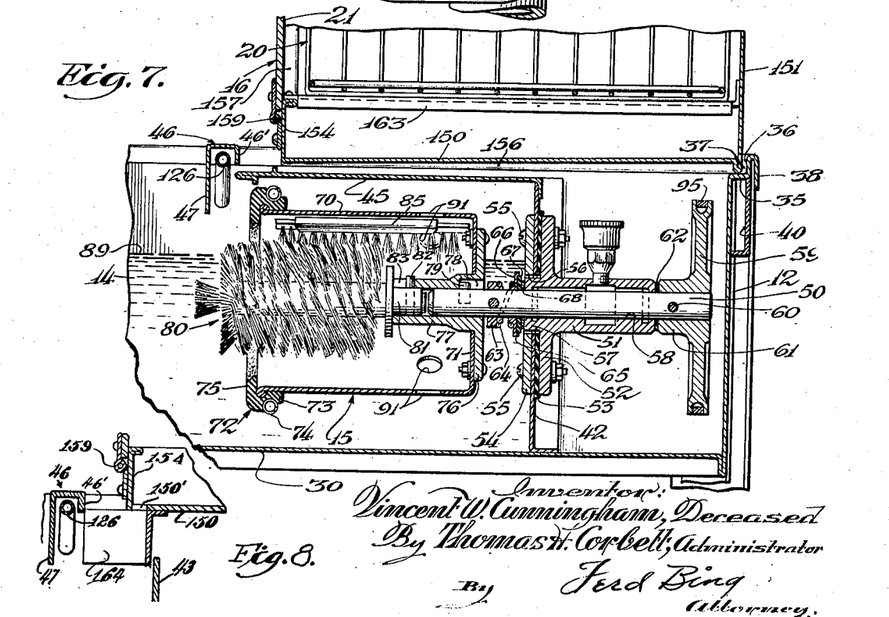
Fig. 7 is a fragmental vertical sectional view taken along the line 7—7 of Figs. 1 and 6.
Fig. 8 is a fragmental vertical sectional view taken along the line 8—8 of Fig. 6.

The open-top base 11 is formed from sheet metal to provide a rectangular bottom wall 30, upstanding front and rear walls 31 and 32 respectively, and right and left hand side walls 33 and 34 which are joined, where required, as by welding to form watertight joints therebetween. About their upper edges, the walls 31, 32, 33 and 34 are bent outwardly as at 35 and then upwardly as at 36 to form an inwardly facing angular groove 37, and the upper portions thereof and then bent downwardly at 38 in spaced relation to the portion 36 to thereby form an ornamental bordering edge for the base with a downwardly facing groove between the portions 36 and 38 for use in mounting and supporting the machine in certain types of installations. Beneath the portion 35, a sheet metal angle 40 is secured to the outer face of each upstanding wall, as shown in Figs. 6 and 7, and these angles are so mounted that the vertical flange is aligned with the wall portion 36, thereby to provide for free entry of supporting means between the wall portions 36 and 38 as will hereinafter be described.

The legs 12 are formed from sheet metal angles which are secured as by welding along and in embracing relation to the vertical corners of the base, and these legs 12 are of a length which is just sufficient to provide space for connecting suitable supply lines and drains to the machine.

To form the desired compartments 13, 14 and 17 within the base 11, a first division wall 41 extends from the front wall 31 rearwardly to a point spaced somewhat forwardly of the rear wall 32 where it is joined to a rear division wall 42 which extends to the left hand side wall 34. A similar division wall 43 extends from the division wall 41 to the right hand side wall 33 somewhat forwardly of the rear division wall 42, thereby to divide the base so that the washing compartment is relatively long from front to rear of the machine, while the flushing compartment is somewhat shorter from front to rear, and the drive compartment is substantially L-shaped in form and is located partially behind each of the other two compartments of the base.

As will be evident from a consideration and comparison of Figs. 4 and 7, the rear portion of the wash compartment 14 has a cover wall 45 which is located below the plane of the wall portion 35 and is connected to the rear division wall 42, the side wall 34 and the division wall 41, and the cover wall 45 extends forwardly well beyond the division wall 43 to thereby obviate any possibility that the scrubbing unit 15 might throw water into the drive compartment 17. The proportioning of the cover wall 45 is such that it extends a short distance forwardly beyond the front of the rinse compartment 16, as shown in Fig. 7, and just forwardly of the forward edge of the wall 45 a shroud like channel member 46 is mounted so as to extend transversely across the compartments 13 and 14 between the two side walls 33 and 34. The channel member 46 has a depending rear flange 46' which is relatively short and is positioned substantially over the forward edge of the cover wall 45, while its depending forward flange 47 is relatively long, as shown in Fig. 7, and serves as a mounting and concealing means with respect to certain control means as will hereinafter be pointed out.

The scrubbing unit 15 as herein shown is mounted upon means such as a shaft 50 which is carried on and projects through the rear division wall 42 so that the rear end of the shaft 50 is located in the drive compartment 17 while the forward end thereof is located in the rear portion of the washing compartment 14. Such a mounting of the shaft 50 must, of course, be such as to provide a watertight seal about the shaft, and bearing means for the shaft is therefore provided by a bearing bracket 51 having a flange 52 adapted to be positioned against a rubber disk 53, the disk 53 being located against the rear face of the rear division wall 42. On the forward face of the division wall 42 a clamping plate 54 is provided, and a plurality of clamping bolts 55 extend between the clamping plate 54 and the flange 52 to clamp the same upon the rear division wall 42.

The rubber washer 53, the wall 42 and the clamping plate 54 have aligned openings 56 therein, and an axial hub 57 formed on the bearing 51 projects therethrough so that its end surface is substantially aligned with the forward surface of the clamping plate 54. The bearing bracket 51 has an axial bearing opening 58 formed therein through which the shaft 50 extends, and at its rear end the shaft 50 has a relatively large pulley 59 secured thereto as by means of a set screw 60. Between the hub 61 and the rear end of the bearing bracket 51, a thrust washer 62 is positioned on the shaft 50.

The desired watertight seal about the shaft 50 is provided by means mounted on the shaft 50 forwardly of the hub 57. Thus the collar 63 is pinned on the shaft within the washing compartment 14, and a spring 64 which engages the rear end of the collar 63 acts to force the sealing means 65 into an operative sealing relationship to the forward end of the hub 57. The sealing means 65 as herein shown comprises a disk 66 against which the rear end of the spring 64 bears, and the rear face of the disk 66 is counterbored so as to form a narrow flange which extends rearwardly from the rear face of the disk 66. Within the flange which is thus provided a resilient washer 67 is mounted, this washer being made from rubber or a similar material known as Neoprene. Rearwardly of the resilient washer 67 a thrust washer 68, made from a suitable material such as fibre, is mounted so as to be pressed against the forward face of the hub 57. It will be evident that the spring 64 also acts to maintain the pulley 61 in engagement with the thrust washer 62, and it has been found that the mounting which is thus provided for the shaft 59 provides an effective seal for maintaining the water within the washer compartment 14.

The glass scrubbing unit 15 is preferably of such a character that in its rotative movement it may be utilized to scrub the inner and outer surfaces of a glass, and in order that most efficient scrubbing or cleansing action may be attained, the glass scrubbing unit preferably embodies means whereby a substantial flow of washing solution past the brushes is maintained at all times during the operation of the scrubbing unit. To this end the scrubbing unit 15 comprises a cylindrical housing 70 having one end closed by transverse wall 71 and having the other end open. About its open end the housing 70 has a resilient guard ring 72 which surrounds a portion of the side wall as shown at 73 and is held in place by means of an encircling spring 74. The guard ring 72 has an inwardly projecting flange 75 which prevents the rims of the glasses from being chipped by contact with various internal parts of the scrubbing unit. The transverse rear wall 71 of the housing 70 has a mounting plate 76 secured thereto, this mounting plate having an internal hub 77 which projects forwardly therefrom into the housing 70 axially thereof. The hub 71 has a central bore therethrough so that the housing may be moved rearwardly onto the forward end of the shaft 50 as shown in Fig. 7, and when the housing is thus positioned, a bayonet slot 78 in the hub 77 is engaged by a pin 79 in shaft 50 to hold the housing in position and impart the desired rotation thereto.

For the purpose of brushing the inside of a glass a tufted central brush 80 is mounted axially within the housing 70, the core of the brush 80 having a fitting 81 at its rear end which is adapted to project into the central bore of the hub 77. A pin 82 on the fitting 81 engages a bayonet slot 83 in the forward end of the hub 77 to hold the brush 80 in position and impart rotation thereto. The outer surfaces of the glasses are scrubbed by means of a plurality of side brushes which are mounted in brush holding channels 85 secured along the inner surfaces of the housing 70.

When the present glass washer is to be used, a drain opening 86 in the bottom of the washing compartment 14 is closed by a stopper 87 which is mounted in compartment 14 by means of a chain 88. The washing compartment 14 is then filled to a level indicated at 89 in Figs. 6 and 7, this level being determined by a suitable overflow which is in the present instance provided by cutting away the forward portion of the division wall 41 as indicated in Figs. 1 and 6. While this level of the washing solution might be such as to completely submerge the washing unit 15 it has been found that proper cleansing operation is attained when this level is somewhat above the central axis of the scrubbing unit 15, and by employing such a water level the operator is better able to move the glasses into registry with the scrubbing unit. In the present instance provision is made for attaining circulation of washing solution through the scrubbing unit 15 and this end is attained through the provision of a plurality of discharge outlets 91 which are in the present instance located in the cylindrical wall of the housing 70 adjacent to the rear or closed end thereof. Thus in the rotation of the scrubbing unit 15 at its normal operating speed of from 200 to 300 R. P. M., washing solution within the scrubbing unit is discharged centrifugally from the housing 70 adjacent to the rear end thereof, and the washing solution is thereby drawn into the open forward end of the scrubbing unit so as to produce a continuous and relatively vigorous flow of washing solution through the scrubbing unit. The washing solution which is thus discharged is retained within the washing compartment 14 by the various walls thereof including the cover wall 45. A splash guard 41' may also be provided on the wall 41, extending to the left just above the upper forward portion of the scrubbing unit.

The driving connection between the motor 16 and the scrubbing unit 15 is in the present instance attained by means of a belt 95 which engages the pulley 59 and a relatively small pulley 96 which is fixed on the rear end of the motor shaft. It will be noted that the construction of the present machine is such that the motor 18 is mounted in a known manner on the bottom wall 30 if the base within the drive compartment 17, the motor shaft being parallel to the shaft 50 and the body of the motor being positioned in part at one side of the rear portion of the washing compartment 14. This relationship is shown in Fig. 4 of the drawings and it is attained by reason of the L-shaped form of the drive compartment 17. A suitable connecting cord 97 extends through the bottom of the drive compartment 17 and is operatively connected to the motor 18 through the medium of a toggle type switch 98 which is mounted on the side wall 33 adjacent to the upper portion thereof. The switch 98 has an operating toggle lever 99 projecting upwardly therefrom and this lever 99 is actuated by means of a Bowden cable indicated generally at 100. This Bowden cable actuator extends forwardly through the wall 43 and through the flange 47 of the mounting and concealing channel 46 so that an actuating knob 101 for the motor switch 98 is located in a convenient position.

It will be noted that the pulleys 59 and 96 are located in spaced relation to the rear wall 32 so as to facilitate mounting and removal of the belt 95. After removal of the belt 95 it may be desirable to remove the shaft 50, as in the instance where an operator desires to replace certain of the washers which are provided about the shaft 50. This end is attained by unfastening of set screw 60. When this is done the spring 64 urges the shaft 50 in a forward direction and the operator may complete this movement so as to withdraw the shaft 50 from the pulley 59 and the bearing bracket 51. This operation is reversed when the shaft 50 is to be remounted.

When the plug 87 is removed so as to drain the washing compartment 14, the water is discharged into a drain fitting 105 which is clamped to the lower surface of the bottom wall 30, and in the present instance the drain fitting 105 is also connected to a constantly open drain port 106 which is provided in the flushing compartment 13. Thus, when water overflows from the washing compartment 14 across the edge 90 of the division wall 41, such water is drained from the flushing compartment 13 through the drain port 106 and the drain fitting 105.

In the present machine provision is made for supplying hot water to the spray machine 22 and to the washing compartment 14, and means is also provided for supplying cold water to the washing compartment 14 and to the flush nozzle 19. The cold water connection is provided immediately beneath the flush nozzle 19 by means of a fitting 110 which has a threaded nipple 111 projecting through the bottom wall 30 and which is clamped in place by a nut 112 threaded on the nipple 111 beneath the wall 30. Within the flushing compartment the fitting 110 is connected to a vertically extended pipe which has a normally closed check valve and nozzle of conventional construction at its upper end. In this construction the check valve is opened by means of an actuating assembly having a sleeve 115 surrounding the pipe and the nozzle. A pair of rubber covered arms 116 project from the upper end of the sleeve 115 and when the rim of an inverted glass is pressed down slowly on arms 116, a flushing flow of water is discharged into the inverted glass.

In order that refuse contained in the glasses which are thus flushed may be collected, a wire basket 117 is preferably mounted about the sleeve 115 so that when the sleeve 115 is lifted, a flange 118 at the lower end thereof will engage the bottom of the basket 117 to lift the same from the flushing compartment. When the basket 117 is in place in the flushing compartment it is supported at its ends by a pair of angle brackets 119 secured to the walls 33 and 41. Since the check valve of the flush nozzle 19 is below the level of the walls of the flushing compartment 13, this construction might be termed an underwater fill for the flushing compartment, and for this reason one or more emergency overflow openings 33' of suitable size are provided in the wall 33 just below the right hand angle bracket 119. Thus inadvertent closing of the drain 106 cannot produce a water level in the flushing compartment above the level of the check valve. Preferably the right hand angle 119 is bent downwardly as at 119' to act as a splash guard with relation to the emergency drain 33'.

A cold water supply line from the fitting 110 to the washing compartment 14 is provided by a pipe 120 which is connected to the rear side of the fitting 110 adjacent to the bottom wall 30, and the pipe 120 extends rearwardly to a point just in front of the division wall 43 at which point the pipe 120 is bent upwardly as shown at 121 in Fig. 6. The upper end of pipe 121 is connected by a union 122 to a pipe and elbow assembly 123 which is in turn connected to the lower or inlet side of a manual valve 124. The valve 124 is located immediately rearwardly of the flange 47 of the concealing channel 46 and it has an operating handle 125 projecting through the flange 47 as shown in Figs. 4 and 6. The outlet of the valve 124 is connected to a header pipe 126 which is closed at its right hand end as indicated at 127 in Fig. 6, and which extends to the left immediately beneath and within the channel 46 to provide a discharge end 128 located over the washing compartment 14.

The hot water supply connection is provided by means of a T-fitting 130 which is located to the left of the wall 33 and just rearwardly of the wall 43, and this fitting 130 has a threaded nipple 131 projecting through the bottom wall 30 and is held in place by nut 132 which is threaded thereon. A pipe 133 is connected to the side of the T fitting 130 as shown in Fig. 6 immediately above the bottom wall 30 and the pipe 133 extends to the left just above the wall 30 and then upwardly along the rear face of the division wall 43 as indicated at 134. At its upper end the portion 134 of the pipe 133 is bent forwardly as at 135 and by means of a union 136 and a pipe and elbow connection 137 this line is connected to the inlet side of a valve 138. The valve 138 is similar in form to the valve 124 and is similarly mounted somewhat to the left of the valve 124 so that a control handle 139 thereof projects forwardly through the flange 47. The handle 139 is located over the flushing compartment 13 and just to the right of the division wall 41. The outlet of the valve 138 is connected to the pipe 126 so that hot water may be fed through the pipe 126 and into the washing compartment 14.

As shown in Fig. 6 of the drawings, a pipe 140 extends upwardly from the fitting 130 and by means of an elbow and pipe arrangement 141 the pipe 140 is connected to the inlet side of a rinse control valve 142. The rinse control valve 142 is mounted in the upper portion of the division wall 43 so that a control valve stem 143 may extend forwardly from the valve 142 and just beneath the lower edge of the flange 47 as shown in Fig. 6 of the drawings. On the forward end of the valve stem 143 a valve handle 144 is provided which extends upwardly in front of the flange 47 to provide for convenient operation of the rinse valve. From the outlet of the valve 142 a pipe 145 extends to the left and is then bent rearwardly as indicated at 146 in Fig. 4. At its rear end the pipe 146 is connected to an elbow fitting 147 which is supported on a bracket 148 secured to the division wall 41 as shown in Figs. 4 and 5. The elbow fitting 147 is utilized in forming a connection with the rinsing spray means 22, and since such connection is related to the form and the mounting of the rinse compartment 16, the rinse compartment will now be described.

The rinse compartment 16 is formed from sheet metal to provide a bottom wall 150, a rear wall 151, side walls 152 and 153 respectively, a forward wall 154, and a top wall 155. The side and rear walls are formed to provide downwardly extending flanges 156 as shown in Figs. 6 and 7, and the dimensions of the rinse compartment are such that these flanges rest in the grooves 37 and upon the horizontal portions 35 of the side walls of the base. The rinse compartment 16 extends forwardly to a point which is relatively close to the concealing channel 46 as shown in Fig. 7 of the drawings. The forward wall 154 of the rinse compartment has a door opening 157 formed therein and the door opening is closed in the present instance by the door 21. As herein shown the door 21 is hinged at 159 along its lower edge, and a latch mechanism 160 is provided on the upper edge of the door for engagement with a keeper mechanism 161 mounted on upper wall 155. When the latch mechanism 160 is released, the door 158 may be pivoted to a horizontal position so that a basket 20 may be inserted into the rinse chamber, and such a basket is supported within the rinse chamber by a plurality of supporting rails 163 which extend from front to rear within the rinse chamber so as to support the basket in an upwardly spaced relation with respect to the bottom wall 150 of the rinse compartment. When water is discharged into the rinse compartment, such water collects on the bottom wall 150 and drains through a suitable drain opening 150' formed in the bottom wall 150 adjacent to the forward edge thereof and over the flush compartment 13. This drain opening 150' is located forwardly of the division wall 43, and a suitable guide or splash fitting 164 is preferably carried by the bottom wall 150 as shown in Fig. 1 of the drawings so as to insure that such water will drain downwardly into the flushing compartment 13 and will be prevented from splashing rearwardly over the wall 43. By varying or gradually reducing the height of the flanges 156 along the side walls of the rinse compartment, a slope of the bottom wall 150 toward its drain opening may be attained.

Since the rinse compartment 16 acts as a cover means for the drive compartment 17, means is provided for releasably securing the rinse compartment in position. In the present instance such releasable mounting of the rinse compartment is attained by utilizing the mounting means of the spray 22 as the sole means for securing the rinse compartment in position. Thus, as shown in Fig. 5 of the drawings the bottom wall 150 of the rinse compartment has an opening 170 formed therein which surrounds a nipple 171 which is formed on the elbow 147. A resilient washer 172 is positioned on a flange 173 of the elbow 147 surrounding the nipple 171 so that the wall 150 rests upon the washer 172. A similar washer 174 surrounds the nipple 171 above the wall 150, and a clamping nut 175 having radially projecting actuating arms 176 is adapted to be threaded onto the nipple 171 to engage the washer 174 and clamp the wall 150 in position with a water-tight seal. The nut 175 also serves as a mounting means for the rotatable spray arms 22, the nut 175 having a cap screw 177 threaded into its upper end. Between the head 178 of the cap screw 177 and the upper surface of the nut 175, the desired rotatable connection or mounting is provided for the spray arms 22. In the present instance the arms 22 project from opposite sides of a supporting sleeve 179 which fits loosely about the cap screw 177 and is contacted on its upper and lower surfaces by fibre washers 180. Thus the arms 122 may rotate about the bearing provided by the cap screw 177, and water is supplied thereto through an axial bore 181 and connecting radial bores 182 formed in the stem of the cap screw and which connect with the interior of the mounting sleeve 179 so that water is supplied to the arms 22 for discharge through spray openings 183 formed in the arms 22. The form of the arms 22, of course, is such that the arms rotate about the axis of the cap screw 77 when water under pressure is supplied to the arms.

When the operator desires to inspect the drive mechanism of the present machine the arms 176 of the nut 175 are grasped and the nut 175 is removed from the nipple 171. The spray assembly may then be removed from the rinse compartment, after which the operator may lift the rinse compartment from the base 11 so as to expose the driving parts of the machine.

As hereinabove pointed out the present machine is compact in character and is adapted for convenient mounting in a large variety of different type of installation. For example, where the present machine is to be used in a soda fountain 26, as shown in Fig. 2, the legs 12 serve to support the machine on the drain board 25 and the length of the legs 12 is sufficient to provide room for the making of connections with the drain fitting 105, with the cold water inlet 111, and with the hot water inlet 131, and the only other connection which is required is the insertion of the attachment plug 185 of the wire 97 into an electrical outlet 186 which in some instances may be provided in the fountain 26.

Where the user wishes to mount the machine at a lower level, as for example in the drain board 27 of the bar 28, the machine may be mounted in a suitable opening cut in the drain board 27. Such an opening is preferably formed with upwardly extending flanges about its edge, and these flanges are arranged to extend into the space between the members 36 and 38 of the side walls of the base.

Where the present machine is to be mounted independently of a bar or soda fountain, the separately formed stand 29 may be employed. This stand 29 may be of any desired form which provides legs and provides an opening at its upper end of the proper size to receive the base 11. The upper edge of the frame or stand 29 is preferably formed from narrow or thin sheet metal as indicated at 189 in Fig. 6 of the drawings so that the portion 189 of the stand may extend into the space between the portions 36 and 38, thereby to support the machine 10 in the desired relation to the stand 29. When used with the stand 29, or when mounted as shown in Fig. 3 of the drawings, the machine is provided with suitable hot and cold water connections and with the drain connection as described in connection with Fig. 2 of the drawings.

From the foregoing it will be apparent that the present invention provides a new and improved machine for scrubbing and rinsing glasses, and that the elements of this machine are arranged to attain unusual compactness which enables the machine to be used in relatively small establishments where space is at a premium. It will also be evident that the present invention has related the elements of the machine to each other in a novel and advantageous manner which attains compactness and yet provides for convenient inspection or adjustment of the drive mechanism. Through the present invention the field of use of glass washing equipment has been widely extended, since the present machine may be made in a standard size or model and may, without modification of this standard machine, be used in a wide variety of establishments.

Hence, while the preferred embodiment of the invention has been illustrated and described, it is to be understood that it is capable of variation and modification and therefore it is not desired to be limited to the precise details set forth, but to avail of such changes and alterations as fall within the purview of the following claims.

The invention claimed is:

1. In a machine for scrubbing and rinsing glasses, a tank-like open-top base section, a rinse compartment having a bottom wall resting upon a rear portion of said base section so as to cover said rear portion, a rinse water supply line extending upwardly through said bottom wall of said rinse compartment, spray means within said rinse compartment removably connected to said water supply line and serving to removably hold said rinse compartment in position on said base section, division wall means within said base section dividing said base section into three compartments, one of which constitutes a washing compartment opening upwardly in front of said rinse compartment and extending rearwardly beneath a portion of said rinse compartment, another of which constitutes a flushing compartment opening upwardly in front of said rinse compartment and extending for a short distance beneath said rinse compartment, and the other of which constitutes a drive compartment, a rotatable glass-scrubbing unit mounted in said washing compartment beneath said rinse compartment, and a drive motor mounted in said drive compartment and operatively connected to said glass-scrubbing unit to drive the same.

2. In a machine for scrubbing and rinsing glasses, a tank-like open-top base section, a rinse compartment having a bottom wall resting upon a rear portion of said base section so as to cover said rear portion, division wall means within said base section dividing said base section into three compartments, one of which constitutes a washing compartment extending rearwardly beneath a portion of said rinse compartment, another of which constitutes a flushing compartment extending for a short distance beneath said rinse compartment, and the other of which constitutes a drive compartment, a rotatable glass-scrubbing unit mounted in said washing compartment beneath said rinse compartment, a drive motor mounted in said drive compartment and operatively connected to said glass-scrubbing unit to drive the same, a water supply line adapted to supply hot water and extending upwardly through said drive compartment and through said bottom wall, spray means within said rinse compartment removably connected to said water supply line and serving to removably hold said rinse compartment in position on said base section, a branch line from said supply line extending forwardly over the division wall means which separates said drive and flushing compartments and then extending to a point over said washing compartment to discharge water therein, and valve means for controlling said branch line having a control handle located over and adjacent the rear portion of said flushing compartment.

3. In a machine for scrubbing and rinsing glasses, a tank-like open-top base section, a rinse compartment having a bottom wall resting upon a rear portion of said base section so as to cover said rear portion while leaving a substantial forward area of said base uncovered, division wall means within said base section dividing said base section into three compartments, one of which constitutes a washing compartment extending rearwardly beneath a portion of said rinse compartment, another of which constitutes a flushing compartment extending for a short distance beneath said rinse compartment, and the other of which constitutes a drive compartment, a rotatable glass-scrubbing unit mounted on a substantially horizontal axis in said washing compartment beneath said rinse compartment so that glasses may be moved downwardly into said washing compartment forwardly of said rinse compartment and then rearwardly into cooperation with said scrubbing unit, a drive motor mounted in said drive compartment and operatively connected to said glass-scrubbing unit to drive the same, a water supply line extending upwardly through said bottom wall, spray means within said rinse compartment removably connected to said water supply line and serving to removably hold said rinse compartment in position on said base section, and a water supply line for filling said washing compartment having a control valve handle located over said flushing compartment.

4. In a machine for scrubbing and rinsing glasses, a tank-like open-top base section, a rinse compartment having a bottom wall resting upon a rear portion of said base section so as to cover said rear portion, spray means within said rinse compartment, division wall means within said base section dividing said base secton into three compartments, one of which constitutes a washing compartment extending rearwardly beneath a portion of said rinse compartment, another of which constitutes a flushing compartment extending for a short distance beneath said rinse compartment, and the other of which constitutes a drive compartment, a rotatable glass-scrubbing unit mounted in said washing compartment beneath said rinse compartment, a drive motor mounted in said drive compartment and operatively connected to said glass-scrubbing unit to drive the same, and means operable to removably hold said rinse compartment in position on said base section.

5. In a machine for scrubbing and rinsing glasses, a tank-like open-top base section, a rinse compartment having a bottom wall resting upon a rear portion of said base section so as to cover said rear portion, a rinse water supply line extending upwardly through said bottom wall of said rinse compartment, spray means within said rinse compartment removably connected to said water supply line and serving to removably hold said rinse compartment in position on said base section, division wall means within said base section dividing said base section into three compartments, one of which constitutes a washing compartment opening upwardly in front of said rinse compartment and extending rearwardly beneath a portion of said rinse compartment, another of which constitutes a flushing compartment opening upwardly in front of said rinse compartment and extending for a short distance beneath said rinse compartment, and the other of which constitutes a drive compartment, a rotatable glass-scrubbing unit mounted in said washing compartment beneath said rinse compartment, a drive motor mounted in said drive compartment and operatively connected to said glass-scrubbing unit to drive the same, a mounting and concealing member extending across said washing and flushing compartments just forwardly of said rinse compartment, a water supply header line mounted behind said member, hot and cold water lines including valves through which they are connected to said header line, a control valve for said rinse water supply line, a switch for controlling said motor and located in said drive compartment, and control handles for said valves and said switch located forwardly of and along said member.

6. In a machine for scrubbing and rinsing glasses, a tank-like open-top base section, a rinse compartment having a bottom wall resting upon a rear portion of said base section so as to cover said rear portion, a rinse water supply line extending upwardly through said bottom wall of said rinse compartment, spray means within said rinse compartment, division wall means within said base section dividing said base section into three compartments, one of which constitutes a washing compartment opening upwardly in front of said rinse compartment and extending rearwardly beneath a portion of said rinse compartment, another of which constitutes a flushing compartment opening upwardly in front of said rinse compartment and extending for a short distance beneath said rinse compartment, and the other of which constitutes a drive compartment, a rotatable glass-scrubbing unit mounted in said washing compartment beneath said rinse compartment, a drive motor mounted in said drive compartment and operatively connected to said glass-scrubbing unit to drive the same, a mounting and concealing member extending across said washing and flushing compartment just forwardly of said rinse compartment, a water supply header line mounted behind said member, hot and cold water lines including valves through which they are connected to said header line, a control valve for said rinse water supply line, a switch for controlling said motor and located in said drive compartment, and control handles for said valves and said switch located forwardly of and along said member.

7. In a machine for scrubbing and rinsing glasses, a tank-like open-top base section, a rinse compartment having a bottom wall resting upon a rear portion of said base section so as to cover said rear portion, a rinse water supply line extending upwardly through said bottom wall of said rinse compartment, spray means within said rinse compartment removably connected to said water supply line and serving to removably hold said rinse compartment in position on said base section, division wall means within said base section dividing said base section into three compartments, one of which constitutes a washing compartment opening upwardly in front of said rinse compartment and extending rearwardly beneath a portion of said rinse compartment, another of which constitutes a flushing compartment opening upwardly in front of said rinse compartment and extending for a short distance beneath said rinse compartment, and the other of which constitutes a drive compartment, a rotatable glass-scrubbing unit mounted in said washing compartment beneath said rinse compartment, a drive motor mounted in said drive compartment and operatively connected to said glass-scrubbing unit to drive the same, a mounting and concealing member extending across said washing and flushing compartments just forwardly of said rinse compartment, a drain connection from said rinse compartment arranged to discharge downwardly into said flushing compartment in the space just rearwardly of said mounting and concealing member, a splash guard carried by said rinse compartment and extending downwardly into said space to prevent splashing of the draining rinse water into said drive compartment, a water supply header line mounted behind said member, hot and cold water lines including valves through which they are connected to said header line, a control valve for said rinse water supply line, a switch for controlling said motor and located in said drive compartment, and control handles for said valves and said switch located forwardly of and along said member.

8. In a glass-washing machine, a substantially rectangular open-top tank-like receptacle having a bottom wall and front, rear and side walls, a first substantially vertical division wall connected to said front wall and extending rearwardly substantially parallel to one of said side walls to a point adjacent to but spaced from said rear wall, a rear division wall located in a substantially vertical plane and extending between and joined to the rear end of said first division wall and said one side wall, both of said division walls being joined to said bottom wall to cooperate with said one side wall and a portion of said front wall in providing a wash compartment, a third division wall connected to and between said first division wall and the other one of said side walls forwardly of said rear division wall and also connected to said bottom wall to define a flushing compartment forwardly of said third division wall and cooperating with other walls in defining an L-shaped drive compartment portions of which are located in the rear of both of said washing and flushing compartments, a cover wall extending between and joined to said first division wall and said one wall and joined to said rear division wall so as to form a watertight seal over a substantial portion of the rear portion of said washing compartment, a drive shaft, a watertight bearing means mounted on said rear division wall and supporting said shaft on a substantially horizontal axis such that the forward end of said shaft extends into said washing compartment and the rear end of said shaft extends into said drive compartment, a glass-washing unit mounted on and driven by the forward end of said shaft and comprising a cylindrical housing concentric with said shaft and open at its forward end to permit entry of washing solution, a central brush mounted concentrically within said housing and a plurality of side brushes mounted along the inner sides of said housing, said housing having openings formed therein adjacent to the rear end thereof through which washing solution may be centrifugally discharged beneath said cover wall, a flush nozzle located in said flushing compartment, drain means connected to said washing compartment and said flushing compartment, stopper means for the drain means of said washing compartment, a drive motor mounted in said drive compartment, a drive connection between said motor and said rear end of said shaft, front, rear, side, bottom and top walls defining a rinse compartment extending over said drive compartment and the rear portions of said wash and flushing compartments, said rinse compartment having a drain discharging into said flushing compartment, spray means located within said rinse compartment, and a water supply connection extending in a water-sealed relation through the bottom of said rinse compartment.

9. In a glass-washing machine, a substantially rectangular open-top tank-like receptacle having a bottom wall and front, rear and side walls, a first substantially vertical division wall connected to said front wall and extending rearwardly substantially parallel to one of said side walls to a point adjacent to but spaced from said rear wall, a rear division wall located in a substantially vertical plane and extending between and joined to the rear end of said first division wall and said one side wall, both of said division walls being joined to said bottom wall to cooperate with said one side wall and a portion of said front wall in providing a wash compartment, a third division wall connected to and between said first division wall and the other one of said side walls forwardly of said rear division wall and also connected to said bottom wall to define a flushing compartment forwardly of said third division wall and cooperating with other walls in defining an L-shaped drive compartment portions of which are located in the rear of both of said washing and flushing compartments, a cover wall extending between said first division wall and said one wall and joined to said rear division wall so as to form a watertight seal over a substantial portion of the rear portion of said washing compartment, a drive shaft, a watertight bearing means mounted on said rear division wall and supporting said shaft on a substantially horizontal axis such that the forward end of said shaft extends into said washing compartment and the rear end of said shaft extends into said drive compartment, a glass-scrubbing unit mounted on and driven by the forward end of said shaft and located principally beneath said cover wall, means incorporated in said scrubbing unit to induce flow of washing solution longitudinally of said unit, a flush nozzle located in said flushing compartment, drain means connected to said washing compartment and said flushing compartment, stopper means for the drain means of said washing compartment, a drive motor mounted in said drive compartment, a drive connection between said motor and said rear end of said shaft, front, rear, side, bottom and top walls defining a rinse compartment extending over said drive compartment and the rear portions of said wash and flushing compartments, said rinse compartment having a drain discharging into said flushing compartment, a water supply connection extending through the bottom of said rinse compartment, and spray means located within said rinse compartment and removably connected to said water supply connection to hold said rinse compartment in position and form a water-tight seal about said water supply line.

10. In a glass-washing machine, a substantially rectangular open-top tank-like receptacle having a bottom wall and front, rear and side walls, a plurality of vertical division walls dividing said receptacle into a wash compartment, a flushing compartment, and an L-shaped drive compartment portions of which are located in the rear of both of said washing and flushing compartments, a cover wall forming a watertight seal over a substantital portion of the rear portion of said washing compartment, a glass-washing unit mounted on a substantially horizontal axis in said washing compartment and beneath said cover wall, drain means connected to said washing compartment and said flushing compartment, stopper means for the drain means of said washing compartment, a drive motor mounted in said drive compartment, a drive connection between said motor and said washing unit, front, rear, side, bottom and top walls defining a rinse compartment located over said drive compartment and the rear portions of said wash and flushing compartments, said rinse compartment having a drain discharging into said flushing compartment, spray means located within said rinse compartment, and a water supply connection for said spray means extending in a water-sealed relation through the bottom of said rinse compartment.

11. In a glass-washing machine, a substantially rectangular open-top tank-like receptacle having division walls dividing said receptacle into a wash compartment, a flushing compartment, and an L-shaped drive compartment a portion of which is located in the rear of both of said washing and flushing compartments, a cover wall closing the top of a substantial portion of the rear portion of said washing compartment, a drive shaft, a watertight bearing means mounted on said rear division wall and supporting said shaft on a horizontal axis such that the forward end of said shaft extends into said washing compartment and the rear end of said shaft extends into said drive compartment, a glass-washing unit mounted on and driven by the forward end of said shaft and located beneath said cover wall, a flush nozzle located in said flushing compartment, drain means connected to said washing compartment and said flushing compartment, stopper means for the drain means of said washing compartment, a drive motor mounted in said drive compartment, a drive connection between said motor and said rear end of said shaft, walls defining a rinse chamber extending over said drive compartment and the rear portions of said wash and flushing compartments, said rinse compartment having a drain discharging into said flushing compartment, spray means located within said rinse compartment, a rinse water supply line extending in a water-sealed relation through the bottom of said rinse compartment, a concealing and mounting member extending across said washing and flushing compartments just forwardly of the forwardmost portion of said rinse compartment, and control means located in front of said member and including means for controlling said rinse water supply line and said motor.

12. In a glass washing machine a substantially rectangular open-top tank-like receptacle having division walls dividing said receptacle into a washing compartment extending in a direction from front to rear along one side of said receptacle and from the front of said receptacle to a point spaced a short distance forwardly of the rear of said receptacle, a flushing compartment between said washing compartment and the other side of said receptacle and extending from the front of the receptacle to a point somewhat forwardly of the rear of said washing compartment, and an L-shaped drive compartment a part of which is located in the rear of both of said washing and flushing compartments, a cover wall forming a watertight seal over a substantial portion of the rear portion of said washing compartment, a drive shaft, a water-tight bearing means supporting said shaft on a horizontal axis such that the forward end of said shaft extends into said washing compartment and the rear end of said shaft extends into said drive compartment, a glass washing unit mounted on and driven by the forward end of said shaft, drain means connected to said washing compartment and said flushing compartment, stopper means for the drain means of said washing compartment, said washing compartment having an overflow into said flushing compartment to maintain a predetermined solution level in said washing compartment, a drive motor mounted in said drive compartment, a drive connection between said motor and said rear end of said shaft, walls defining a rinse compartment extending over said drive compartment and the rear portions of said washing and flushing compartments, said rinse compartment having drain means discharging into said flushing compartment, spray means located within said rinse compartment, a water supply connection extending in a water-sealed relation through the bottom of said rinse compartment, water supply means having connecting means on the bottom of said receptacle, and relatively short legs on said receptacle operable to support said receptacle at a height just sufficient to provide for convenient association of service connections with said water supply and drain means.

13. In a machine for scrubbing and rinsing glasses, a tank-like open-top base section, a rinse compartment having a bottom wall resting upon a rear portion of said base section so as to cover said rear portion, division wall means within said base section dividing said base section into three compartments, one of which constitutes a washing compartment opening upwardly in front of said rinse compartment and extending rearwardly beneath a portion of said rinse compartment, another of which constitutes a flushing compartment opening upwardly in front of said rinse compartment and extending for a short distance beneath said rinse compartment, and the other of which constitutes a drive compartment, a rotatable glass-scrubbing unit mounted in said washing compartment beneath said rinse compartment, and a drive motor mounted in said drive compartment and operatively connected to said glass-scrubbing unit to drive the same.

14. In a machine for scrubbing and rinsing glasses, a tank-like open-top base section, a rinse compartment having a bottom wall resting upon a rear portion of said base section so as to cover said rear portion, division wall means within said base section dividing said base section into three compartments, one of which constitutes a washing compartment extending rearwardly beneath a portion of said rinse compartment, another of which constitutes a flushing compartment extending for a short distance beneath said rinse compartment, and the other of which constitutes a drive compartment, a rotatable glass-scrubbing unit mounted in said washing compartment beneath said rinse compartment, a drive motor mounted in said drive compartment and operatively connected to said glass-scrubbing unit to drive the same, water supply means for said rinse compartment and said washing compartment, and valve means for controlling said water supply means having control handles located over and adjacent the rear portion of said flushing compartment and adjacent the lower forward edge of said rinse compartment.

15. In a machine for scrubbing and rinsing glasses, a tank-like open-top base section, a rinse compartment having a bottom wall resting upon a rear portion of said base section so as to cover said rear portion, means operable to removably hold said rinse compartment in position on said base section, division wall means within said base section dividing said base section into three compartments, one of which constitutes a washing compartment opening upwardly in front of said rinse compartment and extending rearwardly beneath a portion of said rinse compartment, another of which constitutes a flushing compartment opening upwardly in front of said rinse compartment and extending for a short distance beneath said rinse compartment, and the other of which constitutes a drive compartment, a rotatable glass-scrubbing unit mounted in said washing compartment beneath said rinse compartment, a drive motor mounted in said drive compartment and operatively connected to said glass-scrubbing unit to drive the same, a mounting and concealing member extending across said washing and flushing compartments just forwardly of said rinse compartment, water supply lines for said rinse and washing compartments, valves for said lines, a switch for controlling said motor and located in said drive compartment, and control handles for said valves and said switch located forwardly of and along said member.

16. In a machine for scrubbing and rinsing glasses, a tank-like open-top base section, a rinse compartment having a bottom wall resting upon a rear portion of said base section so as to cover said rear portion, division wall means within said base section dividing said base section into three compartments, one of which constitutes a washing compartment opening upwardly in front of said rinse compartment and extending rearwardly beneath a portion of said rinse compartment, another of which constitutes a flushing compartment opening upwardly in front of said rinse compartment and extending for a short distance beneath said rinse compartment, and the other of which constitutes a drive compartment, a rotatable glass-scrubbing unit mounted in said washing compartment beneath said rinse compartment, a drive motor mounted in said drive compartment and operatively connected to said glass-scrubbing unit to drive the same, and means for holding said rinse compartment removably in position on said base section to protect said drive motor and yet permit ready inspection of the motor.

17. In a machine for scrubbing and rinsing glasses, a tank-like open-top base section, a rinse compartment resting upon a rear portion of said base section so as to cover said rear portion, division wall means within said base section dividing said base section into three compartments, one of which constitutes a washing compartment extending rearwardly beneath a portion of said rinse compartment, another of which constitutes a flushing compartment having an open-top portion located forwardly of said rinse compartment, and the other of which constitutes a drive compartment located beneath said rinse compartment, a rotatable glass scrubbing unit mounted in said washing compartment beneath said rinse compartment, a drive motor mounted in said drive compartment and operatively connected to said scrubbing unit to drive the same, and means operable to removably hold said rinse compartment in position on said base section.

18. In a machine for scrubbing and rinsing glasses, a tank-like open-top base section, a rinse compartment resting upon a rear portion of said base section so as to cover said rear portion, a rinse water supply line extending from said base section and discharging into said rinse compartment, division wall means within said base section dividing said base section into three compartments, one of which constitutes a washing compartment opening upwardly in front of said rinse compartment and extending rearwardly beneath a portion of said rinse compartment, another of which constitutes a flushing compartment opening upwardly in front of said rinse compartment, and the other of which constitutes a drive compartment, a rotatable glass-scrubbing unit mounted in said washing compartment beneath said rinse compartment, a drive motor mounted in said drive compartment and operatively connected to said glass-scrubbing unit to drive the same, a mounting and concealing member extending across said washing and flushing compartments just forwardly of said rinse compartment, a water supply header line mounted behind said member, hot and cold water lines including valves through which they are connected to said header line, a control valve for said rinse water supply line, a switch for controlling said motor and located in said drive compartment, and control handles for said valves and said switch located forwardly of and along said member.

19. In a glass washing machine a substantially rectangular open-top tank-like receptacle having division walls dividing said receptacle into a washing compartment extending in a direction from front to rear along one side of said receptacle and from the front of said receptacle to a point spaced a short distance forwardly of the rear of said receptacle, a flushing compartment between said washing compartment and the other side of said receptacle and extending from the front of the receptacle to a point somewhat forwardly of the rear of said washing compartment, and an L-shaped drive compartment a part of which is located in the rear of both of said washing and flushing compartments, a drive shaft, a watertight bearing means supporting said shaft on a horizontal axis such that the forward end of said shaft extends into said washing compartment and the rear end of said shaft extends into said drive compartment, a glass washing unit mounted on and driven by the forward end of said shaft, drain means connected to said washing compartment and said flushing compartment, stopper means for the drain means of said washing compartment, said washing compartment having an overflow into said flushing compartment to maintain a predetermined solution level in said washing compartment, a drive motor mounted in said drive compartment, a drive connection between said motor and said rear end of said shaft, walls defining a rinse compartment extending over said drive compartment and the rear portion of said washing compartment, said rinse compartment having drain means discharging into said flushing compartment, a water supply line discharging into said rinse compartment, water supply means having connecting means on the bottom of said receptacle, relatively short legs on said receptacle operable to support said receptacle at a height just sufficient to provide for convenient association of the service connections with said water supply and drain means.

20. In a machine for scrubbing and rinsing glasses, a tank-like open-top base section, a rinse compartment having a bottom wall resting upon a rear portion of said base section so as to cover said rear portion, division wall means within said base section dividing said base section into three compartments, one of which constitutes a washing compartment opening upwardly in front of said rinse compartment and extending rearwardly beneath a portion of said rinse compartment, another of which constitutes a flushing compartment opening upwardly in front of said rinse compartment, and the other of which constitutes a drive compartment, a rotatable glass-scrubbing unit mounted in said washing compartment beneath said rinse compartment, a drive motor mounted in said drive compartment and operatively connected to said glass-scrubbing unit to drive the same, and means for holding said rinse compartment removably in position on said base section to protect said drive motor and yet permit ready inspection of the motor.

THOMAS H. CORBETT,
*Administrator of the Estate of Vincent W. Cunningham, Deceased.*